Patented Mar. 16, 1926.

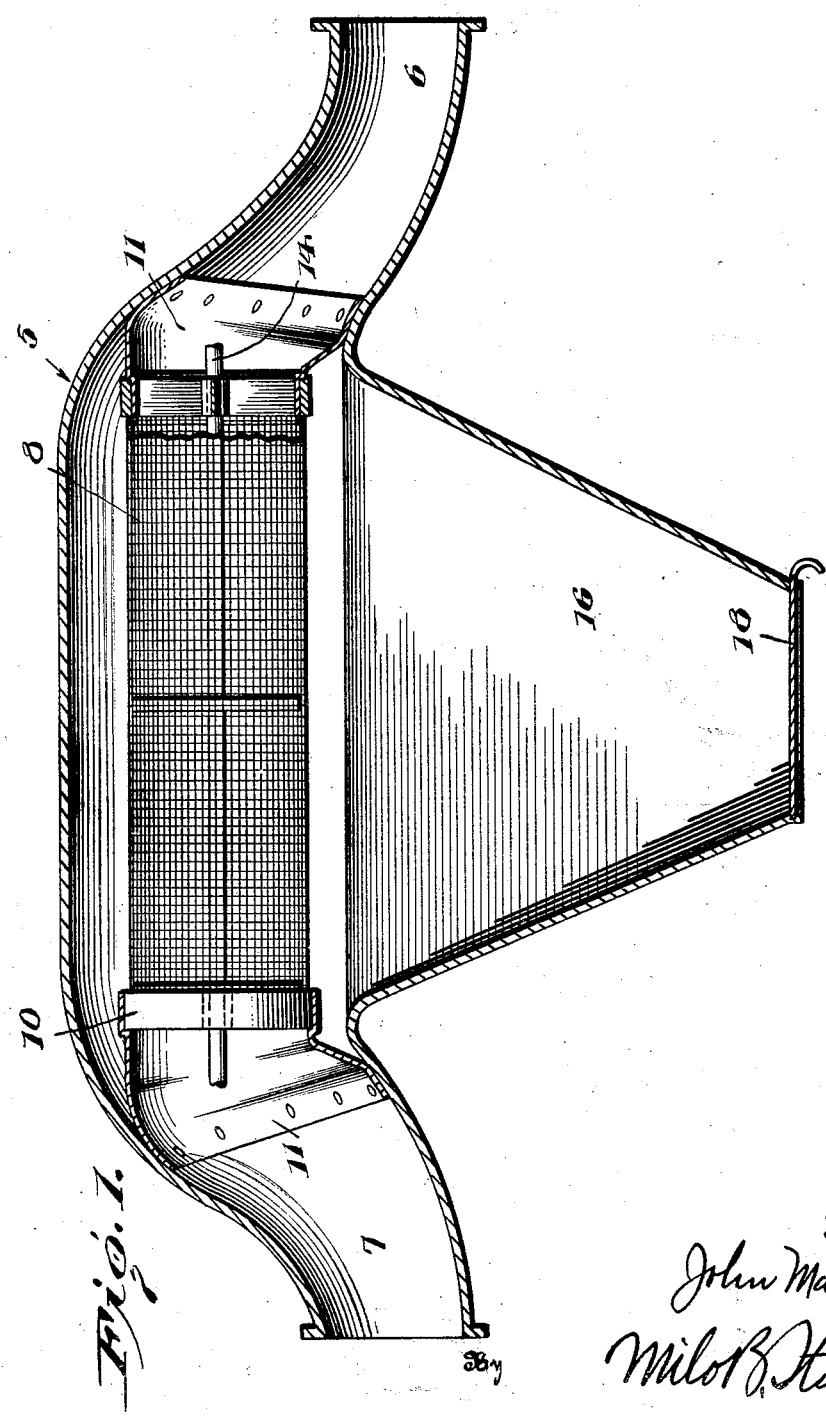

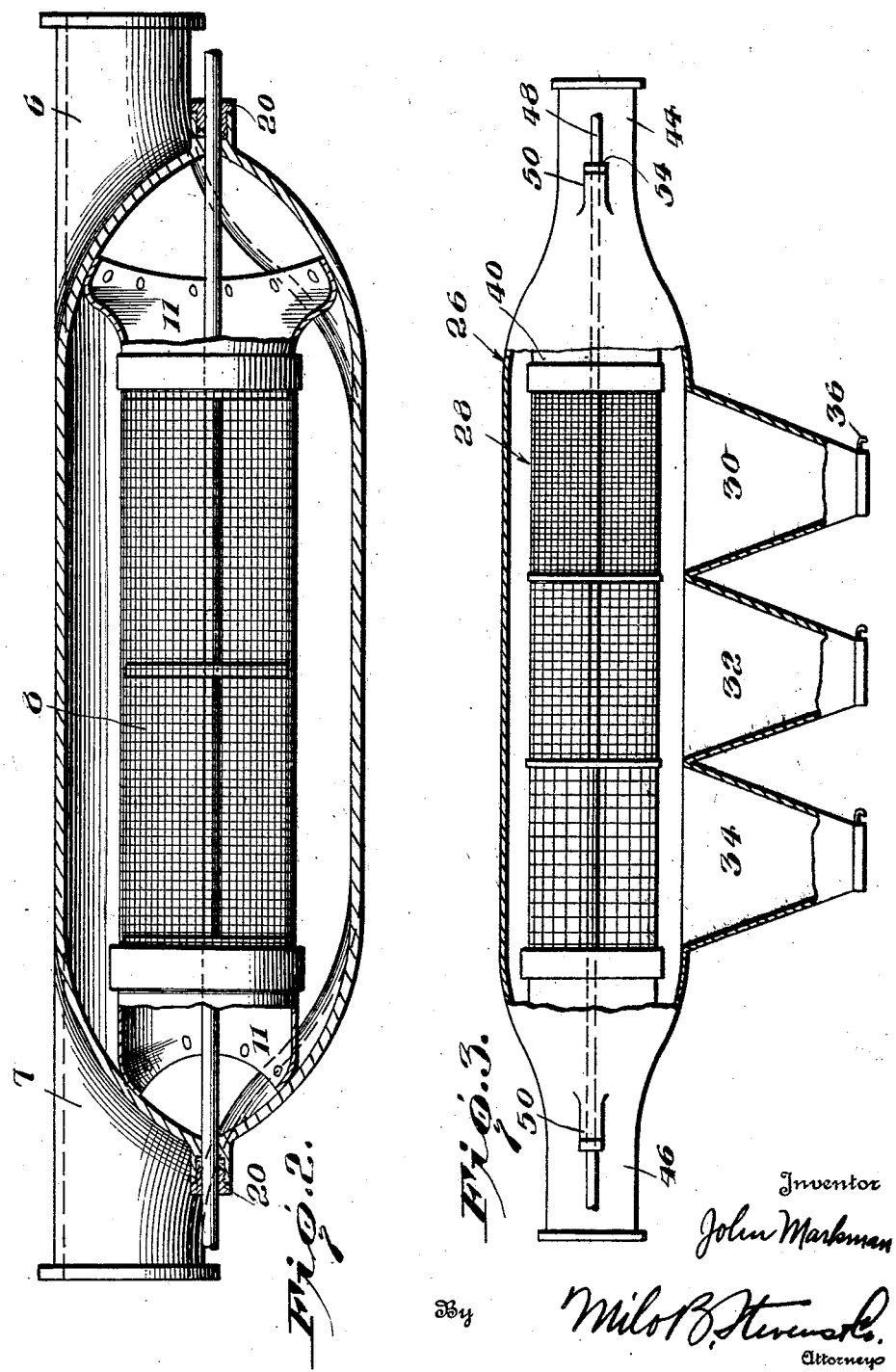

1,577,136

UNITED STATES PATENT OFFICE.

JOHN MARKMAN, OF FORRESTON, ILLINOIS.

MATERIAL-HANDLING APPARATUS.

Application filed May 12, 1925. Serial No. 29,819.

*To all whom it may concern:*

Be it known that I, JOHN MARKMAN, a citizen of the United States, residing at Forreston, in the county of Ogle and State of Illinois, have invented certain new and useful Improvements in Material-Handling Apparatus, of which the following is a specification.

This invention relates to material handling apparatus and more particularly to a separating mechanism by means of which various materials may be separated according to size.

Briefly stated, an important object of the invention is to provide a material handling apparatus consisting of a rotatable screen or squirrel cage having a number of different sections through which the material must pass and which are provided with different sized openings to bring about the separation of the materials of different sizes for collection by bins, railway cars, or the like.

A further and equally important object of the invention is to provide a material handling separating apparatus which may be incorporated in present equipment without elaborate alterations and without the exercise of unusual skill.

Other objects and advantages will be apparent during the course of the following description.

In the accompanying drawing forming a part of this application and in which like numerals are employed to designate like parts throughout the same, Figure 1 is a vertical sectional view through one form of the invention;

Fig. 2 is a horizontal sectional view through the form of the invention illustrated in Fig. 1;

Fig. 3 is a vertical sectional view through another form of the invention, parts being shown in elevation.

In the drawings, the numeral 5 designates a closed fluid conduit adapted to feed and discharge material in fluid suspension to and from the screen and having an inlet 6 and an outlet 7 provided with suitable attaching means. At this point it might be noted that the inlet member 6 may be connected to a centrifugal pump or other material conducting member and the outlet 7 may be connected to any discharge member for conveying the material which does not pass through the screen to a desired point of discharge.

Fig. 1 illustrates that a cylindrical cage 8 is rotatable within the intermediate portion of the body 5 and has a body of screen or other reticulated material through which the material of a size smaller than the openings in the screen may pass. The screen 8 has its ends provided with bands 10 which are rotatably connected to combined supporting and guide members 11 of tubular formation at the ends of the screen. Attention is directed to Fig. 2 which illustrates that the screen 8 is spaced laterally from the axis of or a line passing centrally through the inlet and outlet members 6 and 7, respectively. In other words, the squirrel cage 8 is spaced laterally from the axes of the inlet and outlet members 6 and 7, respectively.

The apparatus illustrated in Figs. 1 and 2 is especially adapted for use in connection with sand, gravel, coal, and the like, and when the cage is turned by a suitable driving mechanism connected to the shaft 14, the smaller particles or grains will pass through the screen and enter the hopper 16. A gate 18 of any design may be located at the bottom of the hopper. The shaft 14 may extend through the offset intermediate portion of the conduit 5 and is surrounded by stuffing boxes 20. The pressure of the water and the like passing through the apparatus cannot result in the escape of water by way of the packing boxes 20 as the packing boxes are spaced from the points of greatest pressure.

In the form of invention illustrated in Fig. 3 the material conduit is designated by the numeral 26 and rotatably receives a squirrel cage 28 having a number of different sections of reticulated material. The openings in the various sections of the screen 28 are of different diameters so that as the material passes through the squirrel cage it will be separated according to size. The fine material will pass through the first section of the screen 28 and enter a hopper 30, while the material of an intermediate size will pass through the openings in the intermediate section of the screen 28 and will drop into the intermediate hopper 32. The larger material will pass through the openings in the last section of the screen 28 and will drop into a hopper 34. The material which is supplied to the hoppers 30, 32 and 34 is controlled by gates 36 and may be discharged into cars, bins, or the like.

The squirrel cage 28 is rotatably supported at the ends thereof by combined guides and supports 40 which have communication with the inlet and outlet members 44 and 46, respectively. The shaft 48 which drives the squirrel cage 28 is extended out through one side of the body 26 and may have connection with a suitable source of power.

In carrying out the invention the bosses 50 through which the shaft 48 extends may be provided with stuffing boxes 54 to prevent leakage. It will be seen that the intermediate portion of the body 26 is offset so the material is caused to make a bend in entering the squirrel cage and in leaving the same.

Having thus described the invention, what is claimed is:

1. A material handling apparatus comprising a body having inlet and outlet branches and bends defining an offset intermediate portion, a rotatable screen of cylindrical formation arranged in the offset intermediate portion of the body between the inlet and outlet branches, combined supporting and guide members of tubular formation having rotatable connection with the ends of said screen and supporting the same and being rigidly mounted in the ends of said offset portion and guiding the material, and a drive shaft connected to said screen and extended thru and supported by the ends of said offset portion.

2. A material handling apparatus comprising a body having inlet and outlet branches and bends defining an offset intermediate portion, a rotatably screen of cylindrical formation arranged in the offset intermediate portion of the body between the inlet and outlet branches, combined supporting and guide members having rotatable connection with the ends of said screen and supporting the same and being supported within and by the ends of said offset portion, said screen having a number of different sections of varying mesh for the separation of materials passing therethrough said body being provided with a plurality of hoppers beneath said screen and a drive shaft connected to said screen and extended through and supported by the ends of said offset portion.

3. A material handling apparatus comprising a body having inlet and outlet branches and bends defining an offset intermediate portion, a rotatable screen of cylindrical formation arranged in the offset intermediate portion of the body between the inlet and outlet branches, combined supporting and guide members having rotatable connection with the ends of said screen and supporting the same and being rigidly connected to the ends of said offset portion, said screen having a number of different sections of varying mesh for the separation of materials passing therethrough, said body being provided with a plurality of hoppers beneath said screen, and a shaft extending through the screen and extended out through and supported by the ends of said offset intermediate portion of the body and being spaced laterally from said inlet and outlet branches.

4. A material handling apparatus comprising a body having inlet and outlet branches and an offset intermediate portion, a rotatable screen of cylindrical formation arranged in the offset intermediate portion of the body between the inlet and outlet branches combined supporting and guide members having rotatable connection with the ends of said screen and supporting the same, said screen having a number of different sections of varying mesh for the separation of materials passing therethrough, said body being provided with a plurality of hoppers beneath said screen, a shaft extending through the screen and extended out through and supported by the ends of said offset intermediate portion of the body, and packing means establishing a liquid tight connection between said body and said shaft, said combined supporting and guide members being rigidly mounted in the ends of said offset portion and forming material conductors.

In testimony whereof I affix my signature.

JOHN MARKMAN.